(12) United States Patent
Henstridge

(10) Patent No.: US 12,042,867 B2
(45) Date of Patent: Jul. 23, 2024

(54) FIXTURE FOR ADDITIVE MANUFACTURING AND HEAT TREATMENT

(71) Applicant: AIRBUS OPERATIONS LIMITED, Bristol (GB)

(72) Inventor: Andrew Henstridge, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 705 days.

(21) Appl. No.: 16/824,956

(22) Filed: Mar. 20, 2020

(65) Prior Publication Data

US 2020/0306887 A1    Oct. 1, 2020

(30) Foreign Application Priority Data

Mar. 25, 2019   (GB) ..................................... 1904060

(51) Int. Cl.
| | |
|---|---|
| *B22F 3/24* | (2006.01) |
| *B22F 10/25* | (2021.01) |
| *B22F 10/64* | (2021.01) |
| *B22F 12/30* | (2021.01) |
| *B23K 26/10* | (2006.01) |
| *B23K 26/342* | (2014.01) |
| *B23K 26/70* | (2014.01) |
| *B33Y 10/00* | (2015.01) |
| *B33Y 30/00* | (2015.01) |
| *B33Y 40/20* | (2020.01) |

(52) U.S. Cl.
CPC ................ *B22F 3/24* (2013.01); *B22F 10/25* (2021.01); *B22F 10/64* (2021.01); *B22F 12/30* (2021.01); *B23K 26/10* (2013.01); *B23K 26/342* (2015.10); *B23K 26/702* (2015.10); *B33Y 10/00* (2014.12); *B33Y 30/00* (2014.12); *B33Y 40/20* (2020.01)

(58) Field of Classification Search
CPC ......... B22F 12/30; F16L 59/12; F27D 5/0006
See application file for complete search history.

(56) References Cited

U.S. PATENT DOCUMENTS

| 6,925,346 B1 | 8/2005 | Mazumder et al. |
| 7,344,608 B2 | 3/2008 | Clark et al. |
| (Continued) | | |

FOREIGN PATENT DOCUMENTS

| EP | 1543908 | 6/2005 |
| EP | 3 406 371 | 11/2018 |
| (Continued) | | |

OTHER PUBLICATIONS

Materalize.com, Jan. 14, 2019, "https://web.archive.org/web/20190114175212/https://www.materialise.com/en/manufacturing/3d-printing-technology/metal-3d-printing" Retrieved Nov. 20, 2023 (Year: 2019).*

(Continued)

*Primary Examiner* — Jacob J Cigna
(74) *Attorney, Agent, or Firm* — Nixon & Vanderhye P.C.

(57) ABSTRACT

A fixture for use in an additive manufacturing and heat treatment process is disclosed. The fixture includes a tool with an upper surface and a lower surface, and an attachment system configured to releasably secure a substrate to the upper surface of the tool. The tool includes a body with an upper face and a lower face, and a reinforcement layer cladding the upper or lower face of the body. The reinforcement layer may be a superalloy.

15 Claims, 7 Drawing Sheets

(56) References Cited

U.S. PATENT DOCUMENTS

| | | | |
|---|---|---|---|
| 7,851,966 B2* | 12/2010 | Rippel | H02K 3/48 |
| | | | 310/215 |
| 8,486,490 B2 | 7/2013 | Fuwa | |
| 9,555,475 B2* | 1/2017 | Sidhu | B22F 10/25 |
| 10,449,696 B2* | 10/2019 | Elgar | B28B 13/02 |
| 11,141,789 B2* | 10/2021 | Stammberger | B22F 10/28 |
| 11,247,273 B2* | 2/2022 | Effernelli | B22F 12/00 |
| 2003/0206820 A1 | 11/2003 | Keicher et al. | |
| 2011/0268989 A1* | 11/2011 | Suzuki | C22F 1/00 |
| | | | 428/668 |
| 2012/0100030 A1 | 4/2012 | Green | |
| 2013/0101728 A1 | 4/2013 | Keremes et al. | |
| 2014/0302188 A1 | 10/2014 | Rix | |
| 2016/0108483 A1* | 4/2016 | Meyer | B23K 26/082 |
| | | | 148/525 |
| 2019/0375009 A1* | 12/2019 | Gibson | B33Y 40/20 |

FOREIGN PATENT DOCUMENTS

| | | | |
|---|---|---|---|
| EP | 3 427 870 | 1/2019 | |
| EP | 3427870 A1 * | 1/2019 | B22F 3/1055 |
| EP | 3427870 A4 * | 1/2019 | B22F 3/1055 |
| FR | 2013/064767 | 5/2013 | |
| GB | 2500412 | 9/2013 | |
| GB | 2531704 | 5/2016 | |
| WO | 2013140146 | 9/2013 | |
| WO | 2013160188 | 10/2013 | |
| WO | 2014/072699 | 5/2014 | |
| WO | WO-2018153656 A1 * | 8/2018 | |

OTHER PUBLICATIONS

Combined Search and Examination Report for GB1904060.9, dated Jun. 18, 2019, 5 pages.

Colegrove, P.A. et al. "Microstructure and residual stress improvement in wire and arc additively manufactured parts through high-pressure rolling" Journal of Materials Processing Technology 213 (2013) 1782-1791.

ASTM International—Standard Terminology for Additive Manufacturing Technologies, three pages (Sep. 2013).

Ibiye Aseibichin Roberts, "Investigation of Residual Stresses in the Laser Melting of Metal Powders in Additive Layer Manufacturing", Thesis retrieved from the internet: <URL:http://wlv.openrepository.com/wlv/bitstream/2436/254913/1/Roberts_PhDThesis.pdf>, Chapter 7, pp. 146-182, Sep. 1, 2012.

Extended European Search Report for European Application No. 20162455.8, 10 pages, Sep. 4, 2020.

* cited by examiner

1

FIXTURE FOR ADDITIVE MANUFACTURING AND HEAT TREATMENT

CROSS RELATED APPLICATION

This application claims priority to United Kingdom (GB) Patent Application 1904060.9, filed Mar. 25, 2019, the entire contents of which is hereby incorporated by reference.

FIELD OF THE INVENTION

The present invention relates to a method and associated apparatus for additive manufacturing and heat treatment.

BACKGROUND OF THE INVENTION

Additive manufacturing typically involves the production of three-dimensional parts by depositing material layer by layer to build either complete components or add features to a pre-formed substrate. It contrasts with conventional subtractive machining processes, in that a component produced by an additive manufacturing process is near net shape, i.e. it is close to its final (net) shape thereby reducing the need for additional finishing and wasted excess material.

A key challenge with additive manufacturing processes, particularly for the production of larger components, is the distortion of the manufactured part during the deposition process due to the high internal stresses generated as the deposited material solidifies.

A solution to this problem is presented in WO2014/072699. A bed supports a parent plate of a work piece which is held in position by clamps. A stack of layers is built on the parent plate by a process of additive manufacturing, and stresses in the work piece are measured by load cells while progressively forming the stack. If such stresses are above a predetermined threshold, the work piece is stress relieved by a cold working process such as cold rolling or peening while mounted to the additive manufacturing apparatus.

In U.S. Pat. No. 7,344,608 a substrate is clamped into a fixture and material is deposited thereon to form a complex article. The article produced is packed, using ceramic inserts and a coating. The packing ensures that the article maintains its true shape and allows for expansion during the subsequent heat treatment process. The packed article, mounted on the fixture, is then placed in a box, encased in a granular material and heated. It is heated to a temperature sufficient to relieve stresses and is maintained at this temperature for a time period such that the stresses in the article are relieved.

In US2016/0108483 a substrate is secured to a fixture and an additive manufacturing system is operated to perform a build process by building a part on the substrate secured to the fixture. The part is built by forming a series of layers of metallic material on the substrate, the metallic material melting and solidifying during the build process thereby bonding the part to the substrate and creating thermally induced stress in the part. The part, the substrate and the fixture are moved together from the additive manufacturing system to a heat treatment system, wherein the substrate remains secured to the fixture and the part remains bonded to the substrate as they are moved. The heat treatment system is operated to perform a heat treatment process by heating the part, the substrate and the fixture together thereby relieving the thermally induced stress in the part, the substrate remaining secured to the fixture during the heat treatment process. Finally the substrate is released from the fixture and the part and the substrate are removed from the fixture. The part remains bonded to the support as they are removed from the fixture.

Ideally the maximum bending stress generated in the fixture by the internal stresses in the part is much less than the stress at which the fixture will experience plastic deformation at the heat treatment temperature, so the fixture remains in the linear elastic regime during the heat treatment process. However, surprisingly it has been found that extreme bending stresses can be generated which cause the fixture to experience plastic deformation. As a result the fixture must either be repaired to restore it to its previous shape, or scrapped.

SUMMARY OF THE INVENTION

A first aspect of the invention provides a fixture for use in an additive manufacturing and heat treatment process, the fixture comprising: a tool with an upper surface and a lower surface; and an attachment system configured to releasably secure a substrate to the upper surface of the tool, wherein the tool comprises a body with an upper face and a lower face, and a reinforcement layer cladding the upper or lower face of the body.

Typically the body comprises a body material and the reinforcement layer comprises a reinforcement material which is different to the body material.

The attachment system may comprises one or more attachment members (such as clamps or fasteners).

Optionally the reinforcement layer is a lower reinforcement layer cladding the lower face of the body opposite the upper surface of the tool. This places the reinforcement layer well away from the upper surface of the tool and well away from a neutral bending axis of the tool, enhancing the stiffness of the tool.

Optionally the lower reinforcement layer has a lower thermal expansion coefficient at 100° C. than the body, preferably more than 20% lower.

Alternatively the reinforcement layer is an upper reinforcement layer cladding the upper face of the body. In this case the tool may also comprise a lower reinforcement layer cladding the lower face of the body opposite the upper reinforcement layer, or the lower face of the body may be unreinforced (i.e. not clad with a reinforcement layer).

Optionally the upper surface of the tool comprises a coating of graphite which inhibits diffusion bonding between the substrate and the upper surface of the tool. This graphite coating may cover the reinforcement layer or it may cover the upper face of the body. Alternatively the upper surface of the tool may comprise the reinforcement layer or the upper face of the body—in this case the substrate is secured by the attachment system in direct contact with the reinforcement layer or the upper face of the body (rather than being in contact with a graphite coating).

Where both upper and lower reinforcement layers are provided, then they may comprise the same reinforcement material, or different reinforcement materials.

Preferably the or each reinforcement layer comprises a metal reinforcement material. The metal reinforcement material may be a pure metal such as Tungsten; or a metal alloy such as a Nickel alloy, Tungsten alloy or Cobalt alloy (such as cobalt chrome).

Optionally the or each reinforcement layer comprises a metal superalloy or high temperature alloy, such as Inconel™ 625 or Inconel™718.

Optionally the body comprises a metal body material, typically a metal alloy body material such as mild steel.

The or each reinforcement layer may have a thickness greater than 1 mm, greater than 2 mm, greater than 3 mm or greater than 4 mm Typically the or each reinforcement layer has a thickness which is more than 1% or more than 2% of a depth of the body between its upper and lower faces.

The or each reinforcement layer may have a thickness less than 30 mm, less than 20 mm, less than 10 mm, less than 9 mm, less than 8 mm or less than 6 mm.

Optionally the body has a depth between its upper and lower faces which is greater than 50 mm, greater than 60 mm or greater than 70 mm.

Optionally the or each reinforcement layer has a thickness which is less than a depth of the body between its upper and lower faces, typically by a factor of five or more. Typically the or each reinforcement layer has a thickness which is no more than 10% of a depth of the body between its upper and lower faces. Preferably the or each reinforcement layer comprises a reinforcement material with a Young's modulus which reduces by less than 30% or less than 20% between 93° C. and 649° C.

Preferably the or each reinforcement layer comprises a reinforcement material with a yield strength 0.2% which reduces by less than 30% or less than 20% between 93° C. and 649° C.

Preferably the or each reinforcement layer comprises a reinforcement material with a Young's modulus at 500° C. which is greater than 100 GPa or greater than 150 GPa. Optionally the or each reinforcement layer comprises a reinforcement material with a Young's modulus at 600° C. which is greater than 100 GPa or greater than 150 GPa.

Preferably the body comprises a body material; the or each reinforcement layer comprises a reinforcement material; and a Young's modulus at 500° C. of the or each reinforcement material is greater than a Young's modulus at 500° C. of the body material. Optionally a Young's modulus at 600° C. of the or each reinforcement material is greater than a Young's modulus at 600° C. of the body material, preferably by a factor of two or more.

Preferably the or each reinforcement layer comprises a reinforcement material with a yield strength 0.2% at 500° C. which is greater than 400 MPa or greater than 600 MPa. Optionally the or each reinforcement layer comprises a reinforcement material with a yield strength 0.2% at 600° C. which is greater than 400 MPa or greater than 600 MPa.

Preferably the body comprises a body material; the or each reinforcement layer comprises a reinforcement material; and a yield strength 0.2% at 500° C. of the or each reinforcement material is greater than a yield strength 0.2% at 500° C. of the body material, preferably by a factor of two or more. Optionally a yield strength 0.2% at 600° C. of the or each reinforcement material is greater than a yield strength 0.2% at 600° C. of the body material, preferably by a factor of four or more.

Optionally the or each reinforcement layer is bonded to the body, for instance by weld coating, spray forming or diffusion bonding.

Preferably the or each reinforcement layer is bonded to the body across a full area of the reinforcement layer, rather than being attached by fasteners or bonded at certain points only.

Optionally the body has a pair of end faces and a pair of side faces; and the end faces are unreinforced.

Optionally the body comprises a single continuous block of a body material, rather than a lattice structure.

Optionally the reinforcement layer dads the upper or lower face of the body, and the lower or upper face of the body opposite the reinforcement layer is unreinforced (in other words it is not clad with a reinforcement layer). In this case, then optionally the reinforcement layer has a different thermal expansion coefficient at 100° C. to the body, preferably differing by a factor of 20% or more.

In one embodiment the reinforcement layer clads the lower face of the body opposite the upper surface of the tool; the upper face of the body is not clad in reinforcement material; and the reinforcement layer has a lower thermal expansion coefficient at 100° C. than the body, preferably more than 20% lower.

A further aspect of the invention provides a method of manufacturing the fixture of the first aspect, the method comprising cladding the body with the or each reinforcement layer by a weld coating process or a spraying process (such as cold metal spraying).

A further aspect of the invention provides a method of additive manufacturing and heat treatment, the method comprising: a) providing a fixture according to the first aspect of the invention; b) securing a substrate to the upper surface of the tool with the attachment system; c) operating an additive manufacturing system to perform a build process by building a part on the substrate secured to the tool, the part being built by forming a series of layers of metallic material on the substrate, the metallic material melting and solidifying during the build process thereby bonding the part to the substrate and creating thermally induced stress in the part; d) moving the part, the substrate and the fixture from the additive manufacturing system to a heat treatment system, wherein the substrate remains secured to the tool and the part remains bonded to the substrate as they are moved; e) operating the heat treatment system to perform a heat treatment process by heating the part, the substrate and the fixture together thereby relieving the thermally induced stress in the part, the substrate remaining secured to the tool during the heat treatment process; f) operating the attachment system to release the substrate from the tool so that the substrate is no longer secured to the tool by the attachment system; and g) separating the part and the substrate from the fixture, wherein the part remains bonded to the substrate as they are separated from the fixture.

A further aspect of the invention provides apparatus for performing the method of the preceding aspect, the apparatus comprising: an additive manufacturing system which can be operated to perform the build process; a heat treatment system which can be operated to perform the heat treatment process; and a fixture according to the first aspect which can be moved between the additive manufacturing system and the heat treatment system.

A wide variety of additive manufacturing process may be employed, including (but not limited to) directed energy deposition (in which thermal energy is used to fuse the metallic material as it is deposited); powder bed fusion (in which thermal energy selectively fuses regions of a powder bed); or any other additive manufacturing process which creates thermally induced stress in the built part. In one embodiment of the invention the additive manufacturing process forms the series of layers of metallic material on the substrate by feeding metallic feedstock material and melting the metallic feedstock material with a laser beam, electric current or other thermal energy source as it is deposited.

The attachment system may comprises one or more attachment members (such as clamps or fasteners) which are engaged with the substrate in step b) and disengaged from the substrate in step f).

Preferably the substrate is secured to the tool by one or more clamps or fasteners in step b); and the (or each) clamp or fastener is released in step f) so that the substrate is no longer secured to the tool. Where fasteners are used, then the substrate may be secured to the tool by one or more fasteners in step b) by passing the (or each) fastener through a respective pre-formed hole in the substrate; and the (or each) fastener released in step f) by removing it from its respective pre-formed hole in the substrate.

Typically the substrate contacts the tool at a substrate/tool interface at the upper surface of the tool during the heat treatment process. Preferably the substrate and tool are formed from dissimilar materials at the substrate/tool interface, thereby inhibiting bonding between them at the substrate/tool interface during the heat treatment process.

During the heat treatment process the temperatures of the part, the substrate and the fixture are typically increased to above 150° C. and maintained above 150° C. for more than 30 minutes.

During the heat treatment process the temperatures of the part, the substrate and the fixture are optionally increased to above 500° C. and maintained above 500° C. for more than 30 minutes.

A temperature sensor may be integrated into the tool or the attachment system and arranged to measure temperature during the heat treatment process.

Preferably the fixture has a mass which is less than ten times, preferably less than five times, and most preferably less than two times a collective mass of the substrate and the part. This makes it easy to transfer them between the additive manufacturing system and the heat treatment system.

The part and the substrate are typically separated from the fixture by removing them from the fixture, although conceivably they could be separated from the fixture by moving the fixture rather than by moving the part and the substrate.

Typically all steps of the method are performed in order a) to g).

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
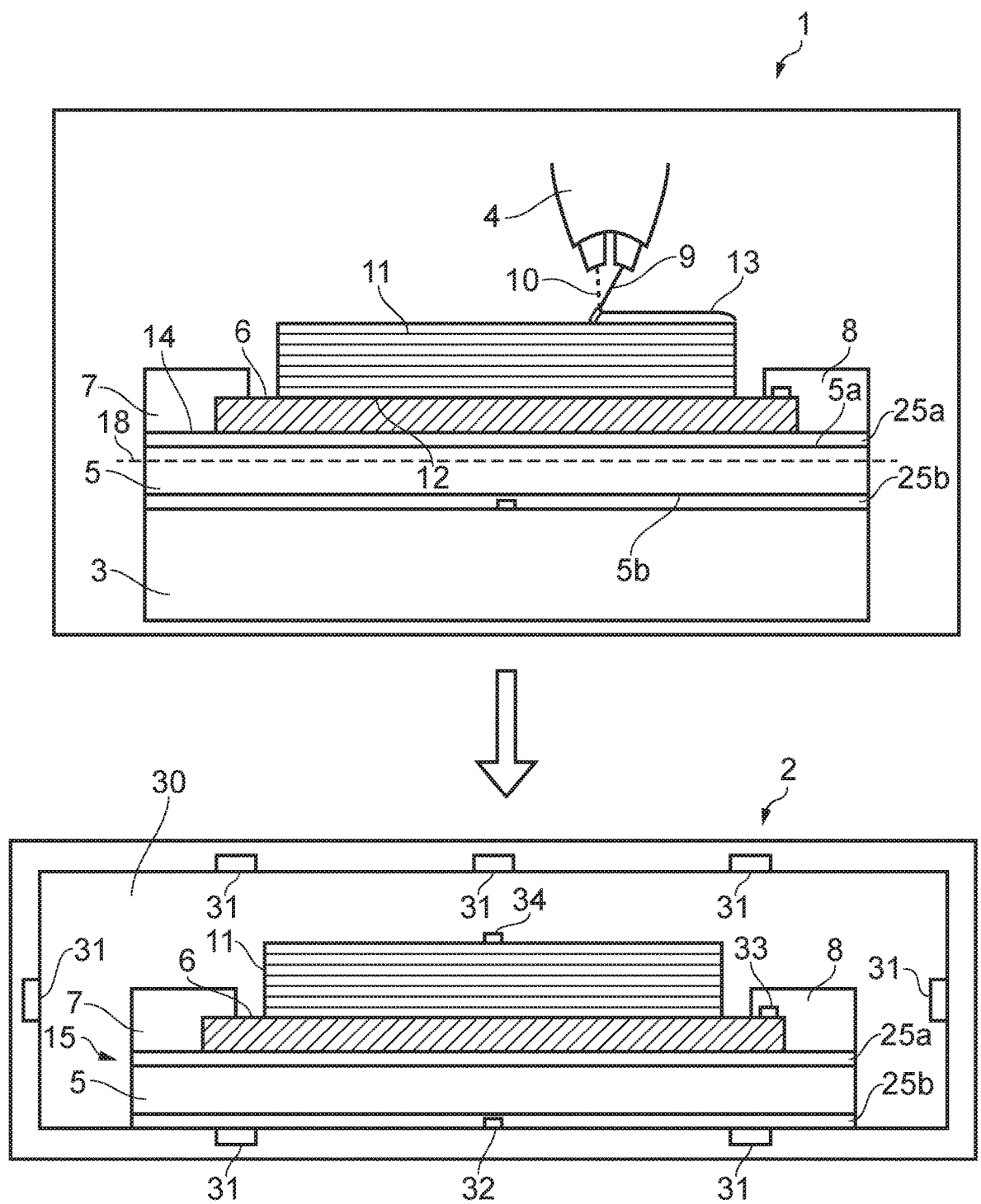
FIG. 1 illustrates an additive manufacturing system and heat treatment system.

FIG. 1 shows an additive manufacturing system 1 and a heat treatment system 2. The additive manufacturing system 1 comprises a chamber containing a table 3 and a build head 4. A fixture 15 is shown in FIG. 1 on the table 3. The fixture 15 comprises a tool 5, 25a, 25b; and a pair of clamps 7, 8.

The tool comprises a body 5 and a pair of reinforcement layers 25a, 25b. The body 5 comprises a continuous block of body material (for instance mild steel S355J2H) with an upper face 5a and a lower face 5b. The upper reinforcement layer 25a clads the external upper face 5a of the body, and the lower reinforcement layer 25b clads the external lower face 5b of the body. The upper and lower reinforcement layers 25a, 25b are made from the same reinforcement material, which by way of example may be a super alloy such as Inconel™ 623, Inconel™ 718, or a cobalt chrome alloy.

The tool has an upper surface 14 (the external face of the upper reinforcement layer 25a) and a lower surface (the external face of the lower reinforcement layer 25b) opposite the upper surface 14. In a first step, a substrate 6 is placed on the upper surface 14 of the tool and secured by clamps 7, 8 to the upper surface 14 of the tool. The upper surface 14 of the tool is the external face of the upper reinforcement layer 25a, so the substrate 6 is in direct contact with the reinforcement material rather than the mild steel forming the body 5.

Optionally the upper surface 14 of the tool comprises a coating of graphite which covers the upper reinforcement layer 25a and inhibits diffusion bonding between the substrate 6 and the reinforcement material. So in this case the substrate 6 would by secured by the clamps 7, 8 in direct contact with the graphite coating, rather than in direct contact with the reinforcement material of the upper reinforcement layer 25a.

The substrate 6 is pre-formed, in other words it is not formed by additive manufacturing on the tool. Typically the substrate 6 is secured to the tool outside the chamber of the additive manufacturing system 1, and then the fixture 15 carrying the substrate 6 is introduced into the chamber and placed on the table 3.

In a second step, the build head 4 is operated to perform a build process by building a near net shape part 11 on the substrate 6 secured to the tool. The build head 4 feeds metallic feedstock material 9 (such as titanium alloy or aluminium alloy) towards the substrate 6, and the material 9 is melted by a laser beam 10 as it is fed onto the substrate 6. The feedstock material 9 may be fed in the form of a wire or a blown powder, for example. The build head 4 is scanned across the substrate 6 to build a part by forming a series of layers of metallic material on the substrate 6. These layers include a first layer which fuses to the substrate at a part/substrate interface 12, and a series of additional layers each of which fuses with a previously deposited layer. One of these additional layers 13 is shown in the process of being laid down by the build head 4. The shape and size of each layer is determined in accordance with a computer aided design (CAD) model of the part 11 stored in a memory. Although the layers are all identical in FIG. 1 for ease of illustration, they may in general have different shapes and/or sizes.

Figure 2:
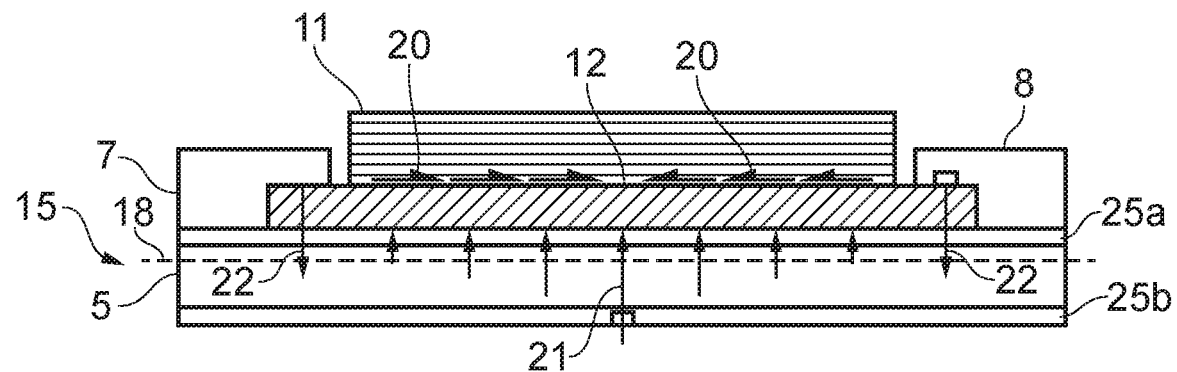
FIG. 2 illustrates the forces acting on the substrate in the clamped condition during deposition.
Figure 3:
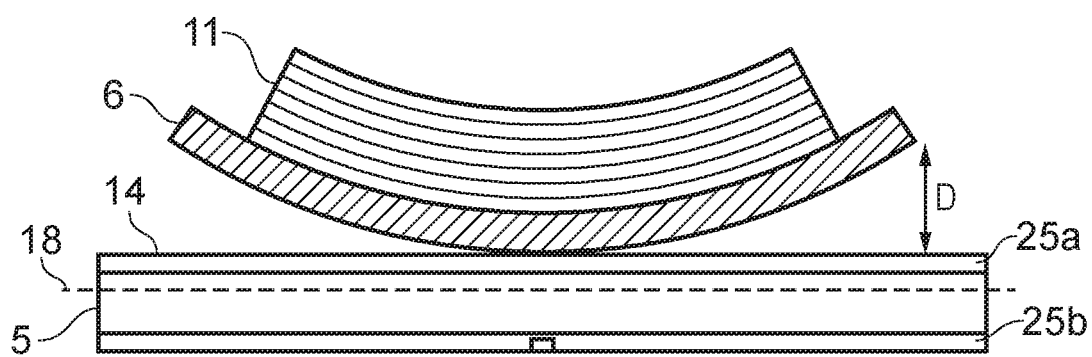
FIG. 3 illustrates the distortion which would result if the clamps were released before heat treatment.

The metallic material melts and solidifies during the build process, thereby fusing the part 11 to the substrate 6 and creating thermally induced stress in the part 11. The forces acting on the substrate 6 in the clamped condition during the build process are shown in FIG. 2. These include shear forces 20 at the interface 12 generated by the shrinkage of the metal as it solidifies and fuses to the substrate 6. These shear forces 20 are reacted by upward reaction forces 21 from the tool and downward reaction forces 22 from the clamps. If the clamps 7, 8 were released then the bending moment generated by the shear forces 20 would cause the part 11 and substrate 6 to become distorted as shown in FIG. 3.

Returning to FIG. 1, after the part 11 has been fully built, the part 11, the substrate 6 and the fixture 15 are lifted off the table 3, removed from the chamber, and moved together to the heat treatment system 2. The substrate 6 remains clamped to the tool and the part 11 remains bonded to the substrate 6 as they are moved.

The tool 5, 25a, 25b and clamps 7, 8 are as light as possible so they can be manually moved relatively easily between the additive manufacturing system 1 and the heat treatment system 2. Typically a collective weight of the tool 5, 25a, 25b and the clamps 7, 8 is less than ten times the collective weight of the substrate 6 and the part 11. More preferably a collective weight of the tool 5, 25a, 25b and the clamps 7, 8 is less than five times the collective weight of the substrate 6 and the part 11. Most preferably a collective weight of the tool 5, 25a, 25b and the clamps 7, 8 is less than twice the collective weight of the substrate 6 and the part 11.

Next the heat treatment system 2 is operated to perform a heat treatment process by heating the part 11, the substrate 6 and the fixture 15 together thereby relieving the thermally induced stress in the part, the substrate remaining clamped to the tool during the heat treatment process. The heat treatment system 2 comprises a chamber 30 and heating elements 31 such as electric resistive heaters (or any other kind of heating element). The nature of the heat treatment process depends on a number of factors, principally the material of the part 11—specifically the chemical composition of the feedstock material and the desired microstructure and properties of the part. Generally speaking, the heat treatment process involves increasing the temperature to an elevated stress relieving temperature at which at least some of the thermally induced stress in the part 11 is relieved by a process of creep relaxation.

In one example, in the case where the part 11 and substrate 6 are formed from a titanium alloy such as Ti6Al4V, the heating elements 31 are operated to increase the temperature in the chamber from room temperature up to an elevated stress relieving temperature of about 680° C. over a period of about 90 minutes, the temperature is held at this elevated temperature for about 180 minutes, and then the heating elements 31 are turned off and the temperature returns to room temperature over a period of the order of 90 minutes. In another example, in which the part 11 and substrate 6 are formed from an aluminium alloy, then a lower stress relieving temperature of the order of 320° C. can be used.

Ideally the maximum bending stress generated in the tool 5, 25a, 25b by the internal stresses in the part 11 is much less than the stress at which the tool 5, 25a, 25b will experience plastic deformation at the heat treatment temperature, so the tool 5, 25a, 25b remains in the linear elastic regime during the heat treatment process.

The tool 5, 25a, 25b is designed with sectional and material properties such that at the elevated stress relieving temperature the bending stiffness of the tool 5, 25a, 25b is much greater than the bending stiffness of the part 11 (typically at least ten times greater) measured perpendicular to the axis along which deposition takes place—in this case the vertical (Z) axis. That is, for each horizontal axis (X, Y): $E_f*I_1 \gg E_p*I_p$ where $E_f$ is the elastic modulus of the material forming the fixture 15, $I_1$ is the areal moment of inertia of the fixture 15, $E_p$ is the elastic modulus of the material forming the part 11 and $I_p$ is the areal moment of inertia of the part 11. This ensures that the part 11 is held approximately flat during both the build process and the heat treatment process.

Note that the fixture 15, the substrate 6 and the part 11 are all heated during the heat treatment process. The tool 5, 25a, 25b and clamps 7, 8 are both formed from a material which is be able to withstand the high temperature of the heat treatment process. Also the thermal mass of the fixture 15 is designed to be relatively low so that the time (and energy) required to heat it up is not too great.

Typically a thermal mass of the fixture 15 is less than ten times the collective thermal mass of the substrate 6 and the part 11. Preferably a thermal mass of the fixture 15 is less than five times the collective thermal mass of the substrate 6 and the part 11. More preferably a thermal mass of the fixture 15 is less than twice the collective thermal mass of the substrate 6 and the part 11.

Optionally a thermal mass of the fixture 15 is approximately equal to the collective weight of the substrate 6 and the part 11, in other words: Cp(fix)*m(fix)+Cp(cl)*m(cl) Cp(sub)*m(sub)+Cp(part)*m(part), where Cp(fix) is the specific heat capacity of the tool 5, 25a, 25b; m(fix) is the mass of the tool 5, 25a, 25b; Cp(cl) is the specific heat capacity of the clamps 7, 8; m(cl) is the mass of the clamps 7, 8; Cp(sub) is the specific heat capacity of the substrate 6; m(sub) is the mass of the substrate 6; Cp(part) is the specific heat capacity of the part 11; and m(part) is the mass of the part 11.

Making the collective thermal masses approximately equal means that the various elements will tend to heat and cool at a similar rate during and immediately after the heat treatment process.

Alternatively it may be beneficial for the fixture 15 to have a higher thermal mass than the substrate 6 and part 11. The temperature rise of the fixture 15 will lag behind the substrate 6 and part 11, increasing the difference between their respective stiffness and yield strengths.

The substrate 6 is preferably formed from a material which is dissimilar to the material forming the upper surface 14 of the tool 5, 25a, 25b at the substrate/tool interface where they engage each other thereby inhibiting diffusion bonding between them during the heat treatment process. Similarly the substrate 6 is preferably formed from a material which is dissimilar to the material forming the clamps 7, 8 at the interface where they engage each other thereby inhibiting diffusion bonding between them during the heat treatment process.

Optionally the substrate 6 is formed from a titanium alloy such as Ti6Al4V, i.e. the same material as the part 11.

When the tool bends upwards in the same sense as the substrate 6 and part 11 as shown in FIG. 3, the upper reinforcement layer 25a is in compression, the lower reinforcement layer 25b is in tension, and a neutral bending axis 18 is neither in compression nor in tension. By placing the reinforcement layers 25a, 25b as far away as possible from the neutral axis 18, the bending stiffness of the tool is enhanced without adding much thermal mass. Note that the neutral axis 18 is not at the mid-plane of the tool (i.e. the plane half way between the upper and lower reinforcement layers 25a, 25b) but rather it is offset from the mid-plane so it is closer to the upper reinforcement layer 25a. This upward offset of the neutral axis is due to the presence of the substrate 6 and part 11.

Thermocouple temperature sensors 32, 33, 34 are used to measure the temperature of the lower reinforcement layer 25b, substrate 6 and part 11 respectively during the heat treatment process, and the measured temperatures are used to control the heating elements 31. The sensors 32 and 33 are integrated into the reinforcement layer 25b and clamp 8 respectively. The sensor 33 is thermally insulated from the clamp 8 but pressed into intimate engagement with the substrate 6 by the clamp.

When the heat treatment process is complete, the fixture 15, substrate 6 and part 11 are removed together from the heat treatment chamber 30. Then the substrate 6 is released from the upper surface of the tool by removing the clamps 7, 8. The heat treatment process reduces the degree of distortion (distance D in FIG. 3) when the clamps 7, 8 are released. Finally the part 11 and the substrate 6 are removed together from the fixture 15, the part 11 remaining bonded to the substrate 6 as they are removed.

Figure 4:
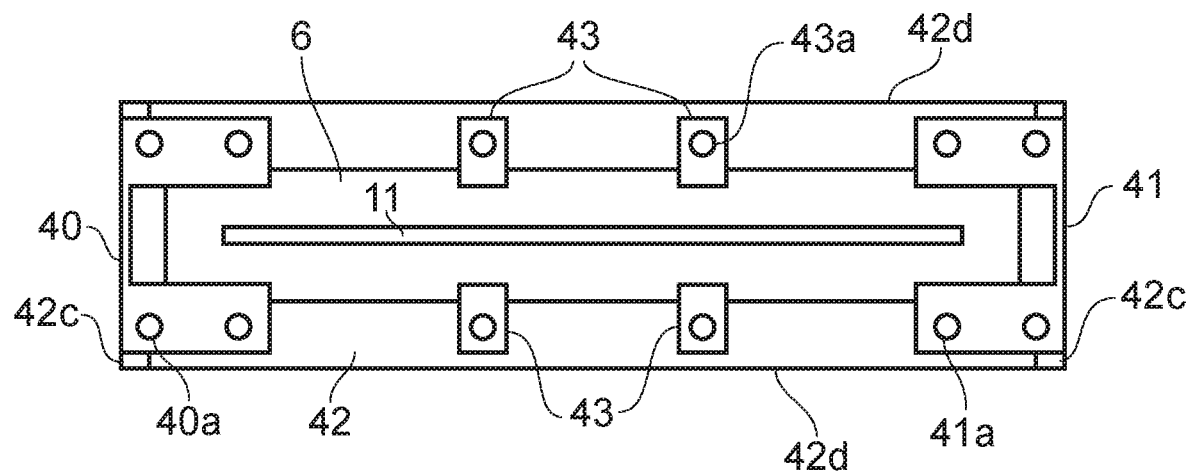
FIG. 4 is a plan view of an alternative tooling arrangement.
Figure 5:
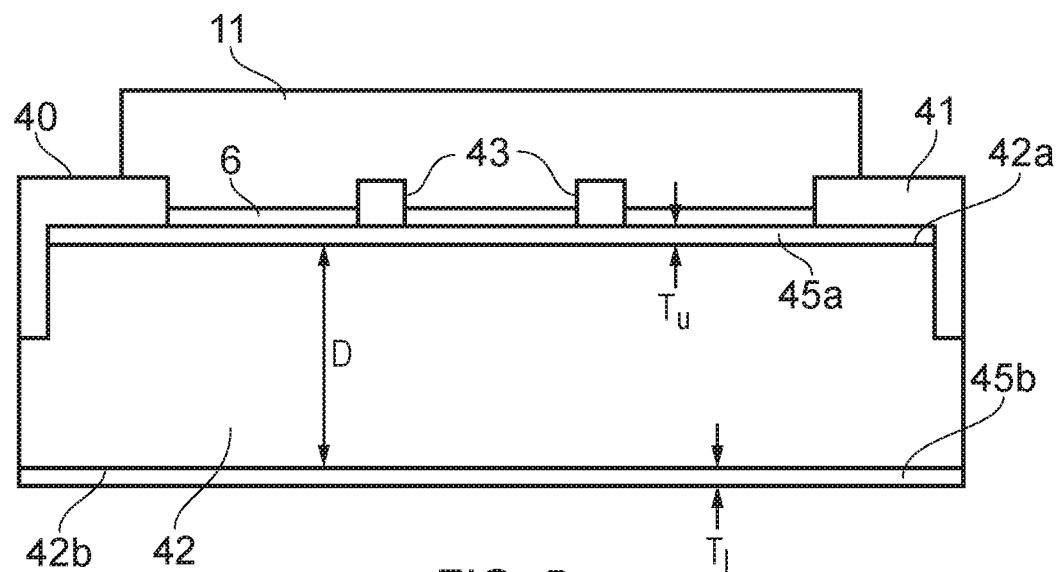
FIG. 5 is a side view of the tooling arrangement of FIG. 4.
Figure 6:
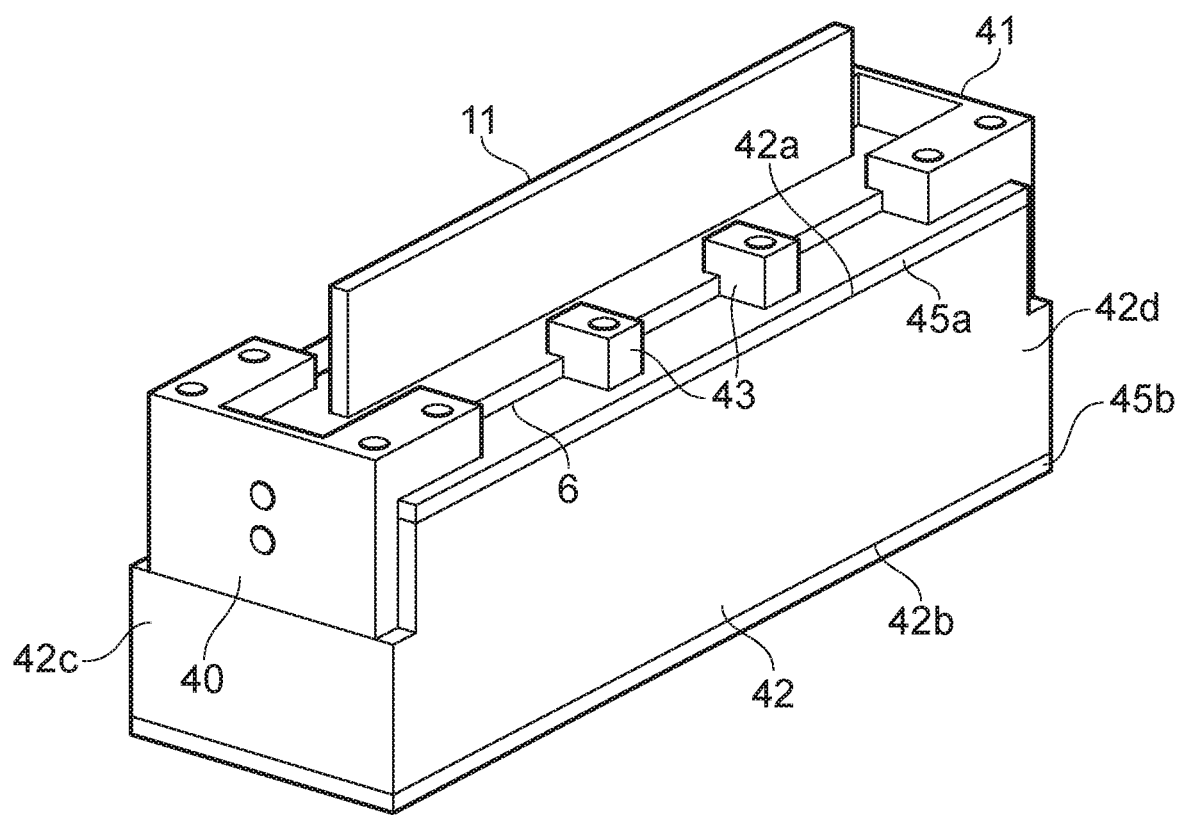
FIG. 6 is an isometric view of the tooling arrangement of FIG. 4.

FIGS. 4-6 show an alternative fixture suitable for use in the process of FIG. 1. In this case the fixture has two end clamps 40, 41 each of which is secured to the tool 42, 45a, 45b by four fasteners 40a, 41a; and four central clamps 43 each of which is secured to the tool by a respective fastener 43a. The clamps 40, 41, 43 are tightened by screwing the fasteners 41a, 43a into the tool, and released by removing the fasteners then lifting off the clamps.

The reinforcement layers 45a, 45b are similar to the reinforcement layers 25a, 25b of the previous embodiment.

As shown by a comparison of FIG. 4 with FIG. 5, the body 42 of the tool is deep relative to the thickness of the reinforcement layers 45a, 45b, in order to maximise its bending stiffness for a given amount of reinforcement material (noting that the reinforcement material is very expensive so it is not desirable to make the whole tool from this material). More specifically, the upper and lower faces 42a, 42b of the body 42 of the tool are separated by an average depth D of the order of 100 mm, the upper reinforcement layer 45a has an average thickness $T_u$ of about 3-10 mm, and the lower reinforcement layer 45b has an average thickness $T_l$ of about 3-10 mm Thus each reinforcement layer 451, 45b has a thickness which is 3%-10% of the depth D of the body 42 between its upper and lower faces. This maximises the stiffening effect of the reinforcement layers 45a, 45b by spacing them far away from the neutral axis, whilst minimising the amount of expensive reinforcement material required.

As shown in FIGS. 4 and 6, the mild steel body 42 has a pair of end faces 42c and a pair of side faces 42d. These end faces 42c and side faces 42d are unreinforced—that is, they are not clad with a reinforcement layer. Optionally the side faces 42d are clad with respective reinforcement layers made of the same reinforcement material as the upper and lower reinforcement layers.

In the example of FIGS. 4-6 there are a number of clamps distributed around the periphery of the substrate 6, but in a further embodiment (not shown) a single "picture frame" clamp may be used to clamp the substrate to the tool around its full periphery.

Figure 7:
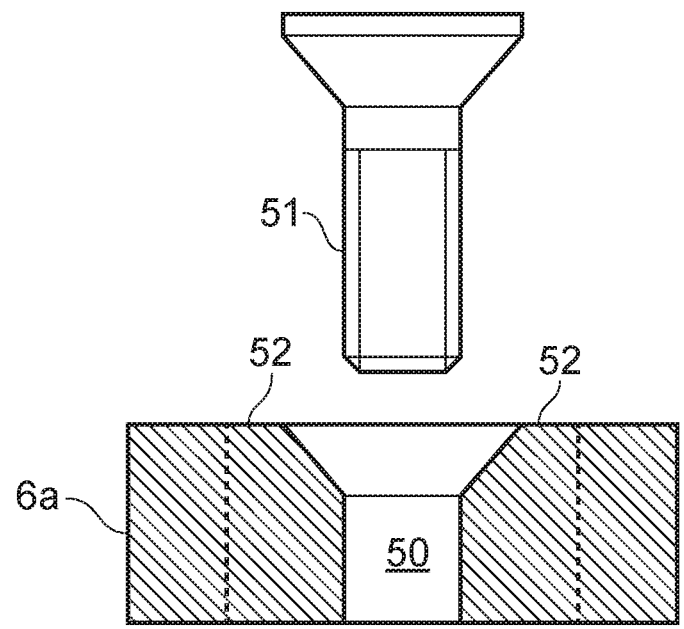
FIG. 7 shows an alternative method of securing the substrate to the tool.

In a further embodiment shown in FIG. 7, the substrate 6 is replaced by a substrate 6a with pre-formed undersized countersunk holes 50, only one of which is shown in FIG. 7. Rather than being secured to the upper surface of the tool by clamps, the substrate 6a is secured to the tool by a number of screws 51 or other fasteners, each of which passes through a respective hole 50 and is screwed into the tool below it. After the part 11 has been built on the substrate 6a, the screws 50 are released by removing them from their holes 50, and the substrate 6a is removed from the tool. Then the holes 50 are enlarged by drilling out material 52 to form cylindrical holes with parallel sides indicated by dotted lines in FIG. 7.

In a further embodiment (not shown) bolts come in from the bottom of the fixture and engage in threaded holes in the substrate.

Figure 8:
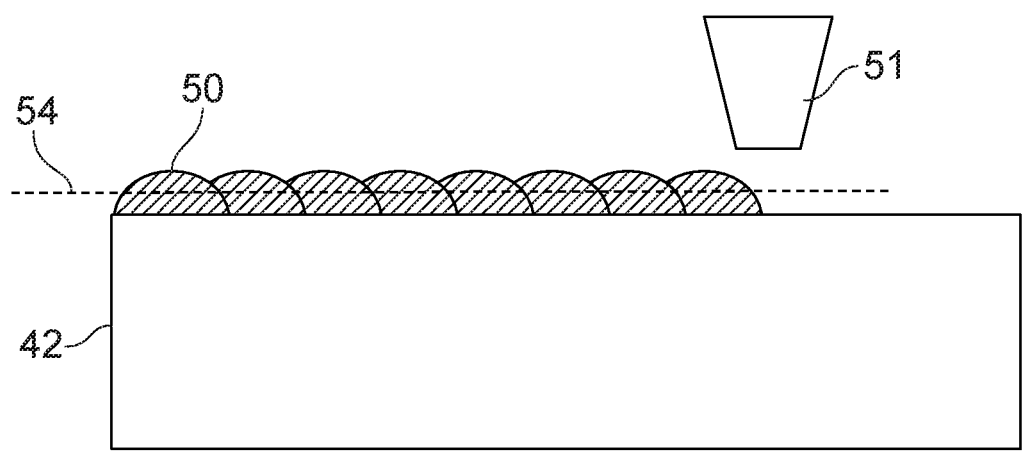
FIG. 8 shows a method of forming one of the reinforcement layers.

FIG. 8 illustrates a method of cladding either of the tools described above by a weld coating process. In this example the upper reinforcement layer 42a is shown being formed on the upper face of the body 42 of the tool of FIG. 6, but the same process can be used to form any of the other reinforcement layers 25a, 25b, 42b.

A welding head 51 deposits a series of lines 50 of molten reinforcement material (for instance Inconel™ 625 or 718) onto the upper face of the body 42. Each line cools, solidifies and fuses to the upper face of the body, forming a continuous bond between the reinforcement layer and the upper face of the body 42 across the full area of the reinforcement layer. After the entire face has been clad, the reinforcement material is ground back to a desired level indicated by a dashed line 54.

Alternative methods of forming and/or bonding the reinforcement layers include cold metal spraying, diffusion bonding and linear friction welding. Another possible method is to place the body of the tool in a mould, and pour molten reinforcement material into the mould so that it coats the upper and/or lower faces of the body.

The material properties of the reinforcement material forming the reinforcement layers 25a, 25b; 42a, 42b are selected to enhance the stiffness and yield strength of the tool at high temperature, and ensure that the tool remains in the linear elastic regime during the heat treatment process.

Tables 1-5 below show material properties of Ti6Al4V (a preferred material for the substrate 6 and the part 11); mild steel S355J2H (a preferred material for the body 5, 42 of the tool); Inconel™ 718 (a first reinforcement material); Inconel™ 625 (a second reinforcement material); and Tungsten (a third reinforcement material).

In Tables 1-5, temperature is given in ° C., the coefficient of linear expansion is given in $10^{-6}$ $K^{-1}$, the Young's modulus E is given in Gpa, and the yield strength is given as the stress in MPa at which a permanent deformation of 0.2% of the original dimension will result.

The parameters in Tables 1-5 may be determined by standard methods. Two ASTM standards that can be used for measuring yield strength and Young's modulus respectively are: ASTM E8/E8M—Standard Test Methods for Tension Testing of Metallic Materials; and ASTM E111 Standard Test Method for Young's Modulus, Tangent Modulus and Chord Modulus.

TABLE 1

| Ti6Al4V | | | | | |
|---|---|---|---|---|---|
| Linear expansion | | E | | Yield Strength 0.2% | |
| Temp | Coefficient | Temp | G Pa | Temp | M Pa |
| 20 to 100 | 8.6 | 20 | 114 | 0 | 900 |
| 20 to 315 | 9.2 | 100 | 114 | 100 | 800 |
| 20 to 650 | 9.7 | 200 | 114 | 200 | 760 |
| | | 300 | 85 | 300 | 570 |
| | | 400 | 85 | 400 | 500 |
| | | 500 | 75 | 500 | 480 |
| | | 600 | 42 | | |

TABLE 2

Mild Steel - Structural Steel - S355J2H

| Linear expansion | | E | | Yield Strength 0.2% | |
|---|---|---|---|---|---|
| Temp | Coefficient | Temp | G Pa | Temp | M Pa |
| 0 to 250 | 11.7 | 20 | 210 | 20 | 520 |
| 0 to 500 | 12.8 | 100 | 210 | 100 | 520 |
| 0 to 1000 | 13.9 | 200 | 189 | 200 | 485 |
| | | 300 | 168 | 300 | 439 |
| | | 400 | 147 | 400 | 381 |
| | | 500 | 126 | 500 | 255 |
| | | 600 | 65.1 | 600 | 118 |
| | | 700 | 27.3 | 700 | 66 |

TABLE 3

Inconel ™ 718

| Linear expansion | | E | | Yield Strength 0.2% | |
|---|---|---|---|---|---|
| Temp | Coefficient | Temp | G Pa | Temp | M Pa |
| | | 21 | 208 | 21 | |
| 200 | 12.8 | 93 | 205 | 93 | 1172 |
| 400 | 13.5 | 204 | 202 | 204 | 1124 |
| 600 | 13.9 | 316 | 194 | 316 | 1096 |
| 800 | 14.2 | 427 | 186 | 427 | 1076 |
| 1000 | 14.4 | 538 | 179 | 538 | 1069 |
| 1200 | 15.1 | 649 | 172 | 649 | 1027 |
| 1400 | 16 | 760 | 162 | 760 | 758 |
| | | 871 | 127 | | |

TABLE 4

Inconel ™ 625

| Linear expansion | | E | | Yield Strength 0.2% | |
|---|---|---|---|---|---|
| Temp | Coefficient | Temp | G Pa | Temp | M Pa |
| | | 21 | 207.5 | 21 | 414 |
| 93 | 12.8 | 93 | 204.1 | | |
| 204 | 13.1 | 204 | 197.9 | | |
| 316 | 13.3 | 316 | 191.7 | | |
| 427 | 13.7 | 427 | 185.5 | | |
| 538 | 14 | 538 | 178.6 | 649 | 734.3 |
| 649 | 14.8 | 649 | 170.3 | 760 | 544.7 |
| 760 | 15.3 | 760 | 160.6 | 871 | 275.8 |
| 871 | 15.8 | 871 | 147.5 | | |
| 927 | 16.2 | | | | |

TABLE 5

Tungsten

| Linear expansion | | E | | Yield Strength 0.2% | |
|---|---|---|---|---|---|
| Temp | Coefficient | Temp | G Pa | Temp | M Pa |
| | | 20 | 400 | 20 | 750 |
| 100 | 4.4 | 800 | 370 | | |
| | | 1200 | 350 | | |
| | | 1800 | 300 | | |

Figure 9:
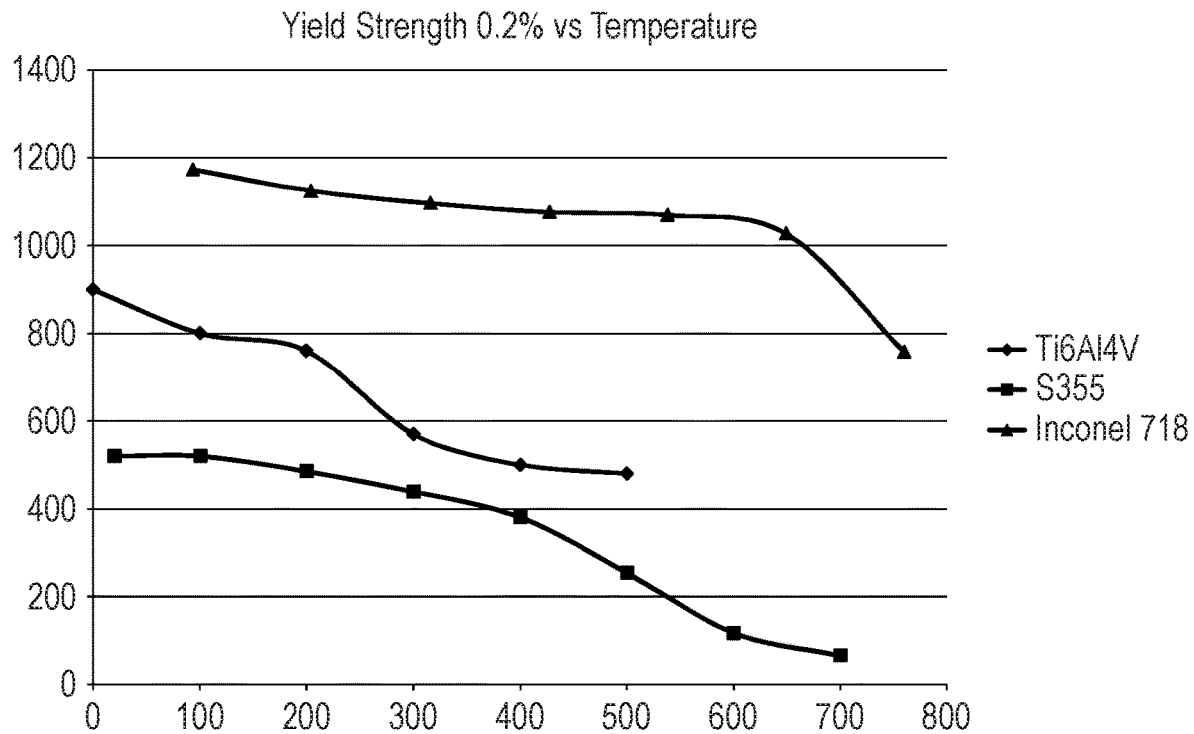
FIG. 9 is a graph of yield strength 0.2% versus temperature.
Figure 10:
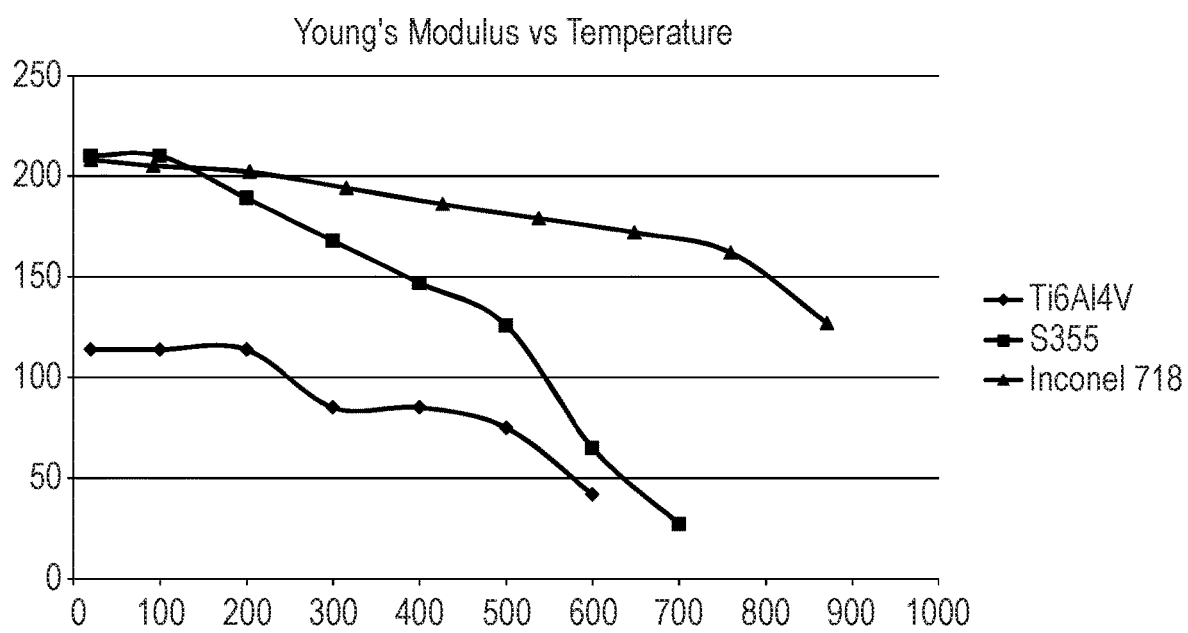
FIG. 10 is a graph of Young's module versus temperature.

FIGS. 9 and 10 illustrate some of the data of Tables 1-3 graphically.

It can be seen from FIGS. 9 and 10 that Inconel™ 718 has a yield strength and Young's modulus which reduces much less (in percentage terms) with temperature than both Ti6Al4V and mild steel. For instance the Young's modulus and yield strength 0.2% reduce by only about 17% and 13% respectively between 93° C. and 649° C.

It can also be seen from FIGS. 9 and 10 that Inconel™ 718 has a higher yield strength and Young's modulus than both Ti6Al4V and mild steel—particularly at high temperatures. Note that the Young's modulus of Inconel™ 718 is about the same as mild steel at room temperature, but the Young's modulus of mild steel drops off quickly with temperature as shown in FIG. 10.

The Young's modulus at 600° C. of Inconel™ 718 (about 175 GPa) is greater than the Young's modulus at 600° C. of mild steel (65.1 GPa) by a factor of about 2.7.

The yield strength 0.2% at 600° C. of Inconel™ 718 (about 1050 MPa) is greater than the yield strength 0.2% at 600° C. of mild steel (118 MPa) by a factor of about 8.9.

Figure 11:
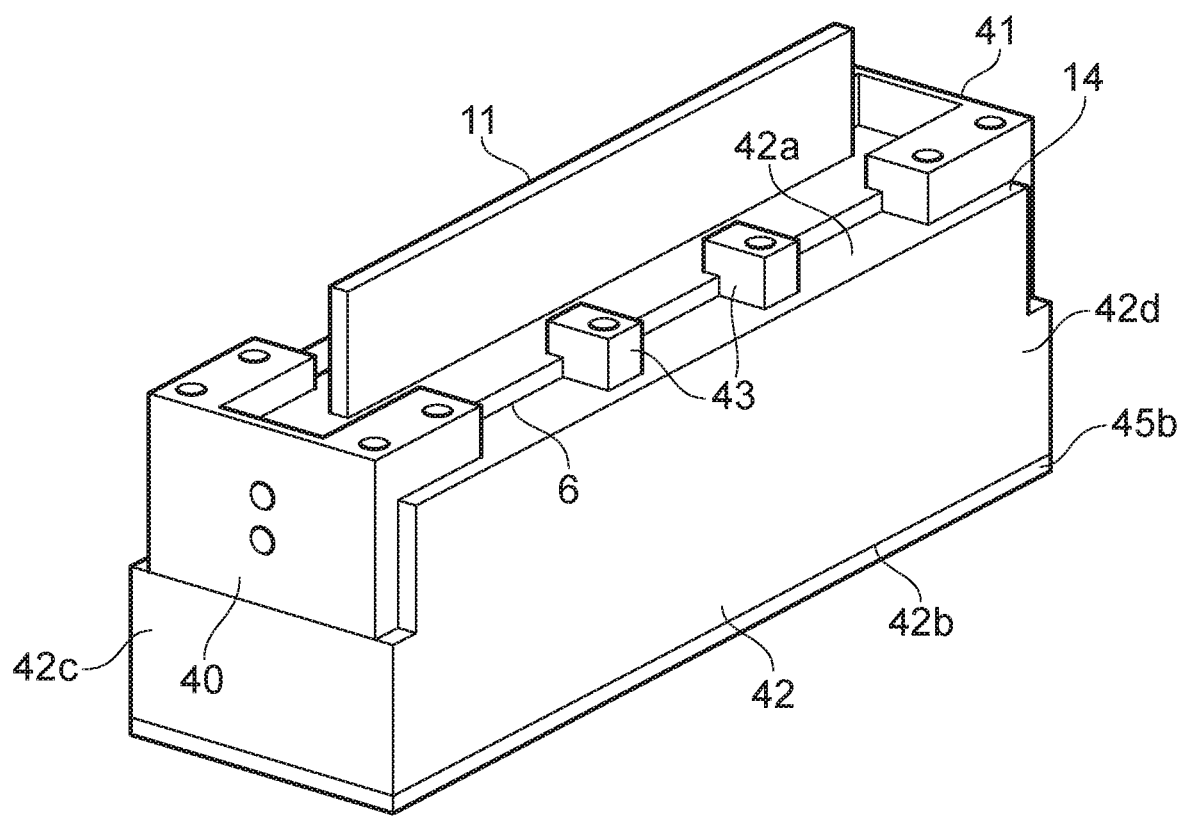
FIG. 11 shows a further alternative tooling arrangement with only a lower reinforcement layer.

FIG. 11 shows an alternative tool which is identical to the tool of FIGS. 4-6 except it omits the upper reinforcement layer 45a. So in this case the lower reinforcement layer 45b clads the lower face 42b of the body 42, and the upper face 42a of the body is unreinforced—that is, it is not clad with a reinforcement layer. The attachment system 40, 41, 43 is configured to releasably secure the substrate 6 to the upper surface 14 of the tool, which in this case is the unreinforced upper face 42a of the body rather than the upper reinforcement layer as in the tool of FIGS. 4-6.

Optionally the upper surface 14 of the tool of FIG. 11 comprises a coating of graphite which inhibits diffusion bonding between the substrate and the upper surface of the tool. In the case of FIGS. 4-6 such a graphite coating would cover the upper reinforcement layer 25a, and in the case of FIG. 11 it would cover the upper face 42a of the body 42 so the substrate is secured by the clamps in direct contact with the graphite coating, rather than in direct contact with the mild steel of the upper face 42a of the body 42.

The tool of FIG. 11 takes advantage of the fact that the lower face 42b of the body, being opposite the substrate, is further from the neutral axis than the upper face 42a of the body. So reinforcement material cladding the lower face 42b is more effective in stiffening the tool than reinforcement material cladding the upper face 42a.

The tool of FIG. 11 has an asymmetrical thermal expansion profile like a bi-metallic strip. That is, the reinforcement layer 45b will have a different thermal expansion coefficient to the mild steel of the body 42, which will result in a bending force being generated as the temperature rises. If the reinforcement material forming the reinforcement layer 45b has a lower thermal expansion coefficient than the mild steel, then this bending force will tend to counteract the bending forces which tend to bend the tool upwards as in FIG. 3. Therefore optionally the reinforcement material forming the reinforcement layer 45b is a low thermal expansion coefficient material which has a thermal expansion coefficient less than that of mild steel, and preferably also less than Ti6Al4V. A suitable low thermal expansion coefficient reinforcement is Tungsten or a Tungsten alloy. As shown in Table 5 above, Tungsten has a thermal expansion coefficient at 100° C. of $4*10^{-6}$ $K^{-1}$ which is less than half that of mild steel ($11.7*10^{-6}$ $K^{-1}$) and Ti6Al4V ($8.6*10^{-6}$ $K^{-1}$).

Although the invention has been described above with reference to one or more preferred embodiments, it will be appreciated that various changes or modifications may be made without departing from the scope of the invention as defined in the appended claims.

The invention claimed is:

1. A fixture for use in an additive manufacturing and heat treatment process, the fixture comprising:
   a tool with an upper surface and a lower surface;

an attachment system comprising one or more clamps or fasteners configured to releasably secure a substrate to the upper surface of the tool, wherein the tool comprises a body with an upper face and a lower face, wherein a reinforcement layer clads the lower face of the body of the tool; and, wherein the upper face of the body of the tool opposite the reinforcement layer is not clad in reinforcement material.

2. A fixture according to claim 1, wherein the lower reinforcement layer has a thermal expansion coefficient more than 20% lower than the body.

3. A fixture according to claim 1, wherein the reinforcement layer comprises a metal reinforcement material.

4. A fixture according to claim 1, wherein the reinforcement layer has a thickness greater than 1 mm.

5. A fixture according to claim 1, wherein the reinforcement layer has a thickness less than 30 mm.

6. A fixture according to claim 1, wherein the upper and lower faces of the body are separated by a depth of the body, and the reinforcement layer has a thickness which is less than the depth of the body.

7. A fixture according to claim 1, wherein the reinforcement layer comprises a reinforcement material with a Young's modulus which reduces by less than 30% between 93° C. and 649° C.

8. A fixture according to claim 1, wherein the reinforcement layer comprises a reinforcement material with a yield strength 0.2% which reduces by less than 30% between 93° C. and 649° C.

9. A fixture according to claim 1, wherein the reinforcement layer comprises a reinforcement material with a Young's modulus at 500° C. which is greater than 100 GPa.

10. A fixture according to claim 1, wherein the body comprises a body material; the reinforcement layer comprises a reinforcement material; and a Young's modulus at 500° C. of the reinforcement material is greater than a Young's modulus at 500° C. of the body material.

11. A fixture according to claim 1, wherein the reinforcement layer comprises a reinforcement material with a yield strength 0.2% at 500° C. which is greater than 400 MPa.

12. A fixture according to claim 1, wherein the body comprises a body material; the reinforcement layer comprises a reinforcement material; and a yield strength 0.2% at 500° C. of the reinforcement material is greater than a yield strength 0.2% at 500° C. of the body material.

13. A fixture according to claim 1, wherein the reinforcement layer is bonded to the body.

14. A fixture according to claim 1, wherein the tool further comprises a mid-plane half way between the upper surface and the lower surface; and the fixture further comprises a substrate releasably secured to the upper surface of the tool by the attachment system; and a neutral bending axis which is offset from the mid-plane so that the neutral bending axis is closer to the upper surface than the lower surface.

15. An apparatus for performing a method of additive manufacturing and heat treatment, the apparatus comprising:
 a. an additive manufacturing system which can be operated to perform a build process;
 b. a heat treatment system which can be operated to perform a heat treatment process; and
 c. a fixture comprising a tool with an upper surface and a lower surface, and an attachment system comprising one or more clamps or fasteners configured to releasably secure a substrate to the upper surface of the tool, wherein the tool comprises a body with an upper face and a lower face, and a reinforcement layer cladding the face of the body, wherein the upper face of the body opposite the reinforcement layer is not clad in reinforcement material, wherein the fixture can be moved between the additive manufacturing system and the heat treatment system.

* * * * *